United States Patent
Ueda et al.

(10) Patent No.: US 11,807,180 B2
(45) Date of Patent: Nov. 7, 2023

(54) RETAINER MEMBER

(71) Applicant: DENSO CORPORATION, Kariya (JP)

(72) Inventors: Keisuke Ueda, Kariya (JP); Taketo Harada, Kariya (JP); Takeo Tsuzuki, Kariya (JP)

(73) Assignee: DENSO CORPORATION, Kariya (JP)

(*) Notice: Subject to any disclaimer, the term of this patent is extended or adjusted under 35 U.S.C. 154(b) by 440 days.

(21) Appl. No.: 17/181,967

(22) Filed: Feb. 22, 2021

(65) Prior Publication Data

US 2021/0170968 A1    Jun. 10, 2021

Related U.S. Application Data

(63) Continuation of application No. PCT/JP2019/029687, filed on Jul. 29, 2019.

(30) Foreign Application Priority Data

Aug. 24, 2018  (JP) ................ 2018-157615

(51) Int. Cl.
*G01S 7/521*   (2006.01)
*B60R 21/01*   (2006.01)
*G01S 15/931*  (2020.01)

(52) U.S. Cl.
CPC .............. *B60R 21/01* (2013.01); *G01S 7/521* (2013.01); *G01S 15/931* (2013.01); *B60R 2021/01006* (2013.01); *G01S 2015/938* (2013.01)

(58) Field of Classification Search
CPC .......... B60R 21/01; B60R 2021/01006; B60R 19/483; G01S 7/521; G01S 15/931; G01S 2015/938
See application file for complete search history.

(56) References Cited

U.S. PATENT DOCUMENTS

2020/0256984 A1*  8/2020  Fukabori ................ G01S 7/521

FOREIGN PATENT DOCUMENTS

| JP | H02-027665 A | 7/1990 |
| JP | H02-032524 A | 9/1990 |
| JP | H07-035846 A | 2/1995 |
| JP | 2000-125378 A | 4/2000 |
| JP | 3999187 B2 | 8/2007 |
| JP | 2010-208557 A | 9/2010 |
| JP | 2019-097153 A | 6/2019 |
| WO | 2019/102755 A1 | 5/2019 |

\* cited by examiner

*Primary Examiner* — Tarun Sinha
(74) *Attorney, Agent, or Firm* — MASCHOFF BRENNAN

(57) ABSTRACT

A retainer member is equipped with a microphone facing portion, a drain path, and a stamped wall portion. The microphone facing portion is formed in a cylindrical shape matching an ultrasonic microphone is disposed outside the ultrasonic microphone in a radial direction extending radially from a longitudinal center line. The microphone facing portion extends from a body retaining portion toward a base side in an axial direction. The drain path extends through the microphone facing portion in the radial direction and is capable of discharging water from an inner space in the microphone facing portion. The stamped wall portion is formed in the microphone facing portion and faces the drain path through the longitudinal center line.

9 Claims, 8 Drawing Sheets

RETAINER MEMBER

CROSS REFERENCE TO RELATED DOCUMENT

The present application claims the benefit of priority of Japanese Patent Application No. 2018-157615 filed on Aug. 24, 2018, the disclosure of which is incorporated herein by reference.

TECHNICAL FIELD

This disclosure generally relates to a retainer member which firmly secures an ultrasonic sensor to a vehicle body component.

BACKGROUND ART

Patent literature 1 discloses a mount structure designed for an ultrasonic sensor to eliminate adverse effects, as arising from entry of water, on performance of the ultrasonic sensor. Specifically, the mounting structure has an outer plate with a hole exposed to an outer surface of the outer plate. The ultrasonic sensor is installed in the hole. The outer plate has a rib which is disposed on an inner surface of the outer plate to retain the ultrasonic sensor. The ultrasonic sensor is secured to the rib through a vibration absorber. A water drain hole is formed on the outer plate or the vibration absorber which is located vertically just beneath the ultrasonic sensor. The water drain hole communicates with space between a housing of the ultrasonic sensor and the outer plate, the rib, or the vibration absorber.

PRIOR ART DOCUMENT

Patent Literature

PATENT LITERATURE 1 Japanese Patent No. 3999187

SUMMARY OF THE INVENTION

A retainer member may be used to secure the ultrasonic sensor to a vehicle body component, such as a bumper. The retainer member is a component or member disposed between a body of the ultrasonic sensor and the vehicle body component. The retainer member is made from a hard synthetic resin, such as ABS resin or polypropylene. The firm attachment of the ultrasonic sensor to the vehicle body component is achieved by securing the retainer member to the body of the ultrasonic sensor and also firmly attaching the retainer member to the vehicle body component.

The patent literature 1 proposes a means for draining water from a portion of the ultrasonic sensor which is attached directly to the vehicle body component, but however, is still silent about a suitable means for draining water from a portion of the ultrasonic sensor which is attached to the vehicle body component through the retainer member.

This disclosure was made in view of the above described problem. Specifically, this disclosure provides a suitable solution to a problem of draining water from a portion of the ultrasonic sensor which is secured to the vehicle body component through the retainer member.

According to one aspect of this disclosure, there is provided a retainer member which secures an ultrasonic sensor to a vehicle body component, the ultrasonic sensor being equipped with a sensor body which includes a cylindrical ultrasonic microphone and a microphone support, the ultrasonic microphone extending in an axial direction parallel to a longitudinal center line and including a protruding portion located on a tip side thereof in the axial direction and a supported portion located on a base side thereof in the axial direction, the microphone support having the protruding portion protruding outside thereof and also retaining the supported portion. The retainer member comprises: (a) a body retaining portion which is formed in a cylindrical shape with a bottom and has an opening in a base side thereof in the axial direction, the body retaining portion having at least a portion of the microphone support disposed therein; (b) a microphone facing portion which is of a cylindrical shape accommodating the ultrasonic microphone, disposed outside the ultrasonic microphone in a radial direction oriented radially from the longitudinal center line, and extends from the body retaining portion toward the tip side in the axial direction; (c) a pair of fastening portions which are of a plate-like shape and equipped with engaging portions engaging the sensor body, the fastening portions extending from the microphone facing portion toward the base side in the axial direction along the longitudinal center line, the fastening portions facing each other across the longitudinal center line; (d) a drain path which passes through the microphone facing portion or a first one of the fastening portions in the radial direction and serves to discharge water from an inner space in the microphone facing portion to outside the inner space; and (e) a stamped wall portion which faces the drain path through the longitudinal center line and is located in the microphone facing portion or a second one of the fastening portions in alignment with the drain path.

In the above structure, the engaging portion of each of the fastening portions extending from the microphone facing portion of the retainer member engages the sensor body of the ultrasonic sensor, thereby attaching the retainer member to the ultrasonic sensor. Upon the attachment of the retainer member to the ultrasonic sensor, the body retaining portion accommodates at least a portion of the microphone support of the sensor body. The microphone facing portion is located outside the ultrasonic microphone of the sensor body. This has the ultrasonic microphone disposed in the space in the microphone facing portion.

A condition where the ultrasonic sensor is firmly attached to the vehicle body component using the retainer member is referred to as a vehicle-mounted condition. In the vehicle-mounted condition, there is a risk that when it is raining, water may enter a joint of the ultrasonic sensor with the vehicle body component. Specifically, an air gap into which water is admitted may be created between the ultrasonic microphone and the microphone facing portion of the retainer member. When water enters and is then accumulated in the air gap in the vehicle-mounted condition, it may result in an increase in unwanted reflected waves arising from propagation of vibration through the accumulated water, which leads to an error in detection of an object.

In the above structure, the retainer member is equipped with the drain path. The drain path is shaped to pass through the microphone facing portion or the fastening portion extending from the microphone facing portion in the radial direction. This enables the drain path to discharge water from the space in the microphone facing portion. The discharging of water from the air gap using the drain path minimizes a risk that water, as having entered from the outside, may be accumulated in the air gap.

The formation of the drain path will result in a decrease in mechanical stiffness of the microphone facing portion or the fastening portion, thereby resulting in imbalance in stiffness between areas of the microphone facing portion which face each other across the longitudinal center line or between the fastening portions. This leads to deterioration of fixation of the ultrasonic sensor in the vehicle-mounted condition.

In order to alleviate the above problem, the retainer member is equipped with the stamped wall portion. The stamped wall portion is formed in the microphone facing portion or the fastening portions and opposed to the drain path across the longitudinal center line. The stamped wall portion is arranged in correspondence with the drain path. For instance, in a case where the drain path is formed in the microphone facing portion, the stamped wall portion is also formed in the microphone facing portion. Alternatively, in a case where the drain path is formed in one of the fastening portions, the stamped wall portion is also formed in the other fastening portion. The stamped wall portion is, like the drain path, shaped to pass through the microphone facing portion or the fastening portion in the radial direction.

With the above arrangements, the formation of the drain path results in a decrease in stiffness of the microphone facing portion or the fastening portion. The formation of the stamped wall portion also results in a decrease in stiffness of the microphone facing portion or the fastening portion. The stamped wall portion and the drain path face each other through the longitudinal center line in the microphone facing portion or the fastening portions. This minimizes the imbalance in stiffness between the areas facing each other through the longitudinal center line.

The above structure minimizes the imbalance in stiffness between portions of the microphone facing portion or between the fastening portions which face each other across the longitudinal center line and also eliminates the risk of a failure in operation of the ultrasonic sensor due to entry of water, such as rain, thereinto in the vehicle-mounted condition. The structure, thus, provides a suitable means for solving the problem with discharge of water from a joint of the ultrasonic sensor to a vehicle body component using the retainer member.

Symbols in brackets in each item of this document are used only to indicate exemplified correspondences between the symbols and means specified below in the embodiment. This disclosure is not limited to what are expressed by the symbols.

EMBODIMENT FOR CARRYING OUT THE INVENTION

Figure 1:
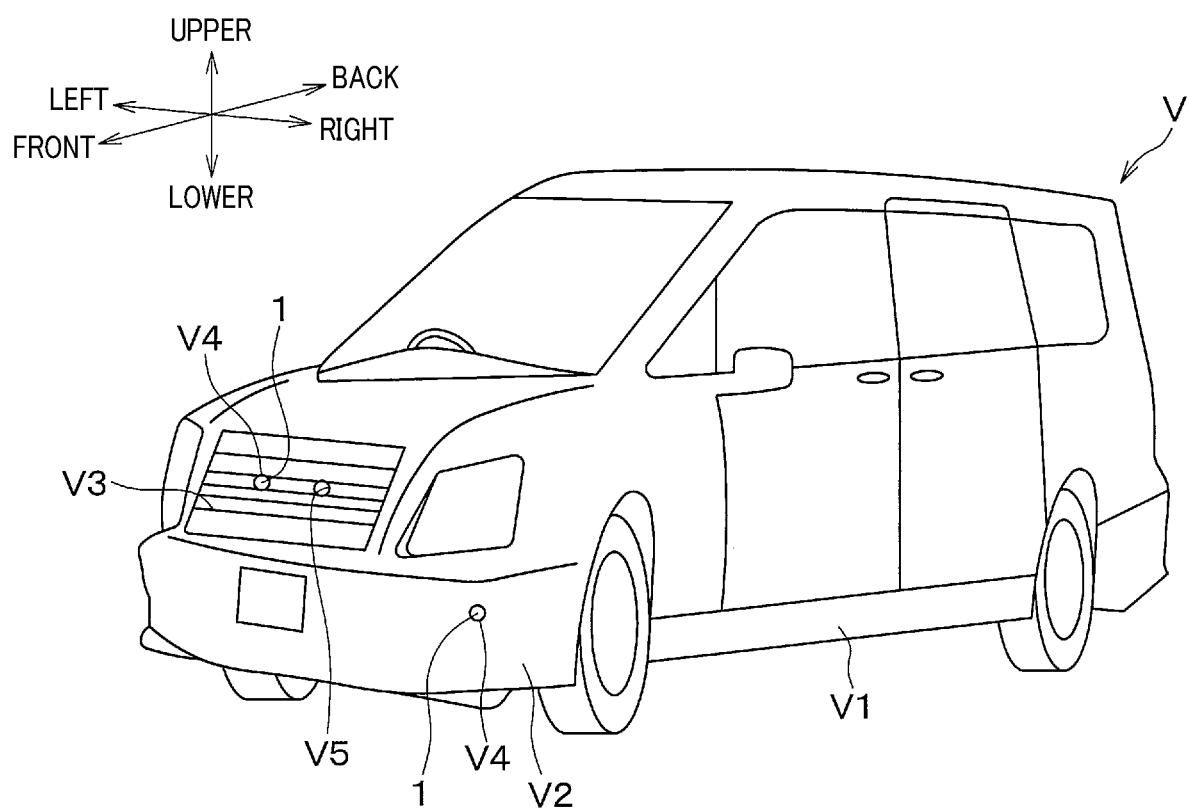
FIG. 1 is an outline view of a vehicle in which an ultrasonic sensor according an embodiment is mounted.

An embodiment in this disclosure will be described below with reference to the drawings. For the simplicity of explanation, longitudinal, lateral, and vertical directions referred to in the embodiment are defined by arrows in the drawings. Possible modifications of the embodiment will be described after discussion of the embodiment because if explanation of the modification is made in the middle of the discussion of the embodiment, it may interfere the understanding of the embodiment.

Structure

Referring to FIG. 1, the vehicle Vis a known four-wheeled vehicle and equipped with the vehicle body V1 which is of a substantially rectangular shape in a plan view. The vehicle body V1 has the bumper V2 and the front grille V3 which are vehicle body components secured to a front end thereof. The front grille V3 is arranged above the bumper V2. The vertical or front-back direction, as referred to in the following discussion, is defined in a vehicle-mounted condition where the ultrasonic sensors 1 are mounted in the vehicle body V1. In the following discussion, the vertical or front-back direction used to refer to a structure of each part is, therefore, based on orientation of each part mounted in or on the vehicle body V1, i.e., in the vehicle-mounted condition.

The bumper V2 and the front grille V3 have formed therein the mounting holes V4 in the shape of through-holes for attaching the ultrasonic sensors 1 thereto. Specifically, in this embodiment, the mounting holes V4 are arranged in two corners of the bumper V2. The two mounting holes V4 are also formed in the front grille V3 to be bilaterally symmetrical with each other. The mounting holes V4 are each shaped to be circular and have the cylindrical inner peripheral surfaces V5.

The ultrasonic sensors 1 are designed to be mountable to the bumper V2 and the front grille V3. An outline of structure of the ultrasonic sensors 1 secured to the front grille V3 and a mounting structure of the ultrasonic sensors 1 secured to the front grille V3 will be described below with reference to FIGS. 2 to 5.

Ultrasonic Sensor

Figure 2:
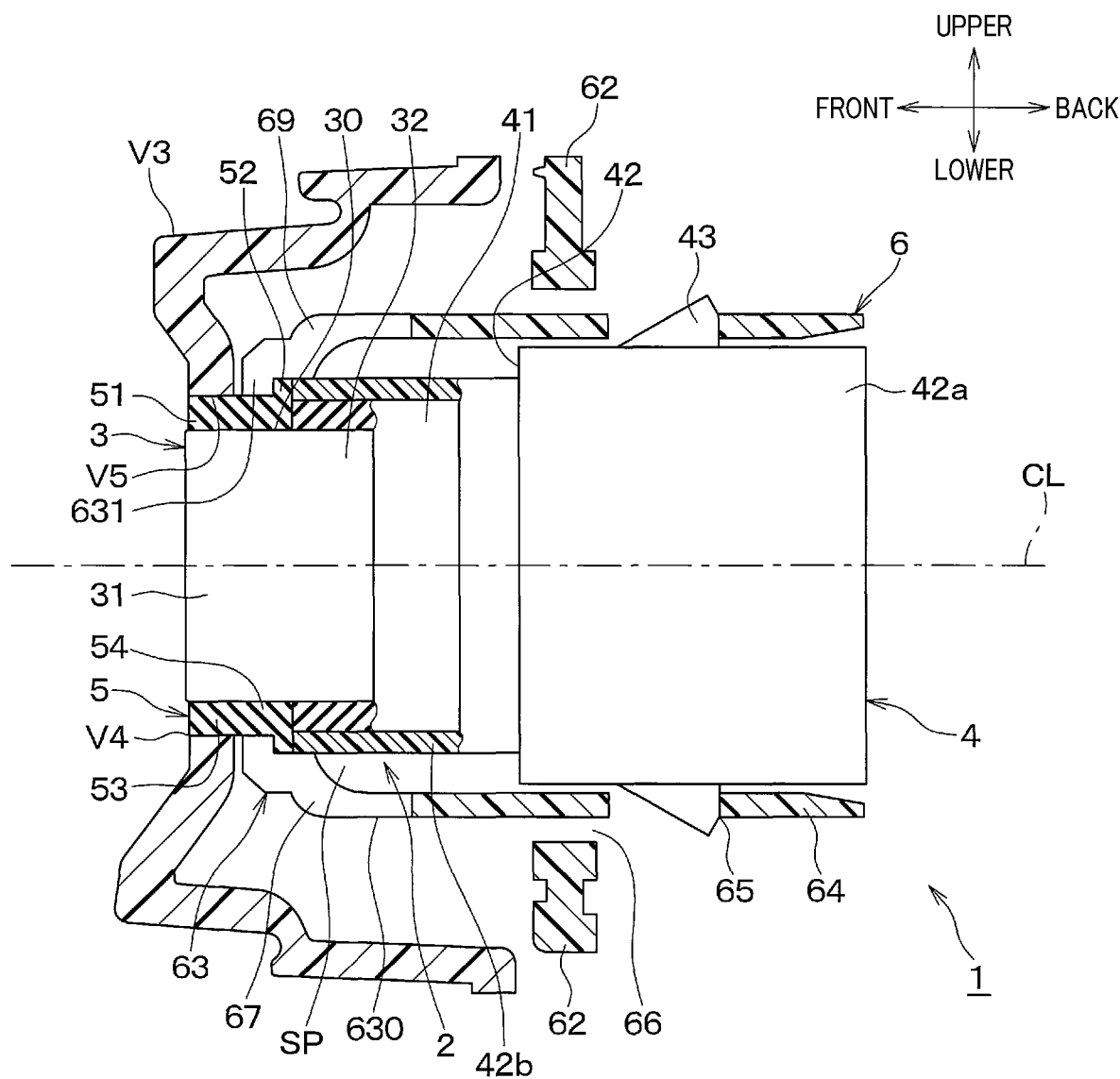
FIG. 2 is a cross sectional side view of the ultrasonic sensor in FIG. 1.

Referring to FIG. 2, the sensor body 2 which constitutes a body of the ultrasonic sensor 1 includes the ultrasonic microphone 3 and the microphone support 4. This embodiment is also equipped with the cushion member 5 and the retainer member 6 which serve as parts for mounting the ultrasonic sensor 1 in the front grille V3.

A condition where the cushion member 5 and the retainer member 6 are temporarily mounted in the sensor body 2 before the ultrasonic sensor 1 is attached to the front grille V3 will also be referred to as a temporarily assembled condition. The temporarily assembled condition is defined for the sake of convenience of discussion of a positional relation among parts in this embodiment. The temporarily assembled condition is, therefore, not necessarily created when the ultrasonic sensors 1 are mounted in the front grille V3.

The ultrasonic microphone 3 is designed to transmit and receive ultrasonic waves. Specifically, the ultrasonic microphone 3 is configured to output a radar wave in a direction along a directivity axis thereof and receive a wave reflected from an object present around the vehicle V.

The ultrasonic microphone 3 has a cylindrical outer shape with the longitudinal center line CL extending parallel to the directivity axis. Specifically, the longitudinal center line CL substantially coincides with the directivity axis. In this embodiment, the ultrasonic microphone 3 the ultrasonic microphone 3 is formed in a cylindrical shape extending in an axial direction parallel to the longitudinal center line CL. In other words, the ultrasonic microphone 3 has the outer peripheral surface 30 which is a cylindrical surface and whose generatrix extending parallel to the longitudinal center line CL.

The ultrasonic microphone 3 is equipped with the protruding portion 31 and the supported portion 32. The protruding portion 31 defines a portion of the ultrasonic microphone 3 disposed on a tip side in an axial direction thereof and protrudes frontward from the microphone support 4. "The tip side", as referred to herein, means a side of the ultrasonic sensor 1, i.e., the sensor body 2 where the ultrasonic microphone 3 protrudes and corresponds to a front side in the drawing.

The supported portion 32 defines a portion of the ultrasonic microphone 3 which is located on a base side of the ultrasonic microphone 3 in the axial direction and embedded in the microphone support 4. "The base side in the axial direction", as referred to herein, is opposite "the tip side in the axial direction" and corresponds to a rear side in the drawing. An end on the base side in the axial direction will also be referred to below as a base end portion.

The microphone support 4 is equipped with the elastic supporting member 41 and the sensor case 42. The elastic supporting member 41 is provided to elastically retain the supported portion 32 of the ultrasonic microphone 3. The elastic supporting member 41 is made from an elastic synthetic resin material such as silicon rubber. The elastic synthetic resin material is usually called soft synthetic resin, viscoelastic material, or elastomer.

Specifically, the elastic supporting member 41 is of a cylindrical outer shape with a bottom and has an opening oriented toward the tip side in the axial direction. The elastic supporting member 41 is designed to have the supported portion 32 of the ultrasonic microphone 3 disposed inside an inner space therein. In this embodiment, the elastic supporting member 41 has a substantially cylindrical outer peripheral surface and a substantially cylindrical inner surface which is placed in close contact with the outer peripheral surface of the ultrasonic microphone 3.

The sensor case 42 is made from a hard synthetic resin, such as polybutylene terephthalate. The hard synthetic resin is not a resinous elastic material, such as elastomer. The sensor case 42 includes the case base 42a and the case head 42b. The case base 42a is of a substantially rectangular parallelepiped box shape in which a circuit board or lead wires (not shown) are disposed. The case base 42a is located closer to the base side than the case head 42b is in the axial direction.

The case head 42b is defined by a portion of the sensor case 42 located on the tip side in the axial direction and of a substantially cylindrical shape extending in the axial direction. The case head 42b surrounds an outer periphery of the elastic supporting member 41 and has the elastic supporting member 41 disposed therein. In other words, the microphone support 4 is shaped to have the protruding portion 31 which is located on the tip side in the axial direction of the ultrasonic microphone 3 and exposed outside thereof. The microphone support 4 is also shaped to elastically bear the supported portion 32 located on the base side thereof.

The sensor body 2 is shaped to be cylindrical and have a shoulder on the sensor case 42 so that the ultrasonic microphone 3 which protrudes outside the case head 42b in the axial direction has a decreased diameter. The sensor case 42 has a pair of fastening protrusions 43. The fastening protrusions 43 project from the outer periphery of the case base 42a in a vertical direction perpendicular to the axial direction.

In the temporarily assembled condition or a vehicle-mounted condition, the cushion member 5 formed in a cylindrical shape is attached to the sensor body 2. The cushion member 5 is located closer to the tip side than the case head 42b is in the axial direction and covers the protruding portion 31 of the ultrasonic microphone 3 in close contact therewith in the temporarily assembled condition or the vehicle-mounted condition. The cushion member 5 is made from an elastic synthetic resin, such as silicon rubber, in a one-piece form.

In this embodiment, the cushion member 5 includes the cylinder 51 and the flange 52. The cylinder 51 is a cylindrical portion of the cushion member 5 extending in the longitudinal center line CL and has an inner peripheral surface. The inner peripheral surface is formed to create a close contact with a portion of the outer peripheral surface 30 of the ultrasonic microphone 3 which is occupied by the protruding portion 31. The flange 52 is formed in a ring-shape and radially outwardly protrudes from a base end portion, i.e., a rear end of the cylinder 51 in the axial direction. "Radially" means a direction perpendicular to the longitudinal center line CL. In other words, "radially" or "radial direction" represents a radial direction of an imaginary circle defined around the center that is an intersection of the longitudinal center line CL and a plane defined to have a normal line coinciding with the longitudinal center line CL. "Outward" in the radial direction represents a direction oriented away from the longitudinal center line CL. The flange 52 is placed in contact with an end surface of the case head 42b which faces in the axial direction of the case head 42b and is located on the tip side of the case head 42b in the temporarily assembled condition or the vehicle-mounted condition.

In the temporarily assembled condition, the exposed portion 53 of the cushion member 5 which forms a tip side of the cushion member 5 in the axial direction is exposed outside the retainer member 6 in the axial direction. The exposed portion 53 is placed in close contact with the inner peripheral surface V5 of the mounting hole V4 in the vehicle-mounted condition where the protruding portion 31 of the ultrasonic microphone 3 is inserted into the mounting hole V4. The held portion 54 that is a portion of the cushion member 5 located on the base side in the axial direction is held by the retaining member 6 in the temporarily assembled condition or the vehicle-mounted condition. The held portion 54 includes a base end portion and the flange 52 of the cylinder 51.

The cushion member 5 is designed to have the exposed portion 53 firmly held between the outer peripheral surface 30 of the ultrasonic microphone 3 and the inner peripheral surface V5 of the mounting hole V4 in the vehicle-mounted condition. The cushion member 5 is also designed to have the held portion 54 firmly gripped between the outer peripheral surface 30 of the ultrasonic microphone 3 and the retainer member 6 in the temporarily assembled condition and the vehicle-mounted condition.

Retainer Member

The retainer member 6 is a part or member used to secure the ultrasonic sensors 1, i.e., the sensor body 2 to the front grille V3. The retainer member is also referred to as a retainer portion, a retainer, or a fastener. The structure of the retainer member 6 in this embodiment will be described below in detail with reference to FIGS. 2 to 5.

The retainer member 6 is, as can be seen in FIG. 2, arranged outside the ultrasonic microphone 3 and the microphone support 4 in the radial direction in the temporarily assembled condition or the vehicle-mounted condition. In this embodiment, the retainer member 6 is shaped to have the exposed portion 53 which is located on the tip side in the axial direction of the cushion member 5 and exposed outside the retainer member 6. The retainer member 6 is configured to have the held portion 54 which is located on the base side in the axial direction of the cushion member 5 and firmly gripped between the retainer member 6 and a portion of the outer peripheral surface 30 of the ultrasonic microphone 3 which is occupied by the protruding portion 31.

The retainer member 6 is formed by a one-piece member made from a hard synthetic resin, such as ABS resin. In this embodiment, the retainer member 6 includes the body retaining portion 61, the vehicle body-attaching portions 62, the microphone facing portion 63, and the fastening portions 64.

The body retaining portion 61 is formed in a hollow cylindrical shape with a bottom and opens at a rear or a base side thereof facing in the backward direction. The body retaining portion 61 is shaped to have at least a portion of the microphone support 4 disposed therein in the temporarily assembled condition and the vehicle-mounted condition. Specifically, the body retaining portion 61 is configured to cover almost the whole of the case base 42a from the tip side in the axial direction.

The body retaining portion 61 includes the side wall 611 and the bottom wall 612. The side wall 611 is formed in a cylindrical shape extending in the axial direction. Specifically, the side wall 611 is formed in a rectangular cylindrical shape which is contoured to conform with an outer shape of the case base 42a. The bottom wall 612 is configured in a substantially flat plate shape which traverses the axial direction, specifically, extends perpendicular to the axial direction. The bottom wall 612 is arranged to close a tip portion of the side wall 611 in the axial direction.

The vehicle body-attaching portions 62 extend from the side wall 611 in an intersecting direction substantially perpendicular to the longitudinal center line CL. The vehicle body-attaching portions 62 are attached to the front grille V3 using a fastening means, such as welding or screwing, when the ultrasonic sensors 1 is secured to the front grille V3. In this embodiment, the retainer member 6 has the two or more vehicle body-attaching portions 62 extending in a direction which is oriented radially and outwardly from the longitudinal center line CL.

The microphone facing portion 63 is a portion of the retainer member 6 which is of a cylindrical shape accommodating the ultrasonic microphone 3 in the temporarily assembled condition or the vehicle-mounted condition and is located on the tip side of the retainer member 6 in the axial direction. In other words, the microphone facing portion 63 is located radially outside the ultrasonic microphone 3 and the cushion member 5 in the temporarily assembled condition and the vehicle-mounted condition. The microphone facing portion 63 is configured to grip the held portion 54 of the cushion member 5 between itself and the protruding portion 31 of the ultrasonic microphone 3 in the temporarily assembled condition and the vehicle-mounted condition.

In this embodiment, the microphone facing portion 63 is formed in a substantially cylindrical shape extending in the axial direction. Specifically, the microphone facing portion 63 extends from the body retaining portion 61 to the tip side in the axial direction.

The microphone facing portion 63 includes the cylindrical portion 630 and the flanged attaching portion 631. The cylindrical portion 630 is defined by a cylindrical portion of the microphone facing portion 63 and extends from the bottom wall 612 toward the tip side in the axial direction. In this embodiment, the cylindrical portion 630 is arranged to cover the case head 42b in the temporarily assembled condition and the vehicle-mounted condition.

The flanged attaching portion 631 is formed in a ring shape protruding from an axial tip end of the cylindrical portion 630 radially inwardly. The flanged attaching portion 631 has an inner diameter substantially equal to an outer diameter of the cylinder 51 of the cushion member 5. The flanged attaching portion 631 is shaped to have an amount by which the flanged attaching portion 631 protrudes radially inwardly and which is substantially equal to that by which the flange 52 of the cushion member 5 protrudes radially outwardly.

In other words, the flanged attaching portion 631 is placed in close contact with the cylinder 51 of the cushion member 5 which corresponds to the held portion 54 in the temporarily assembled condition and the vehicle-mounted condition. The flanged attaching portion 631 is also arranged to face the flange 52 of the cushion member 5 in the axial direction and contacts the flange 52 in the temporarily assembled condition and the vehicle-mounted condition.

In this embodiment, the microphone facing portion 63 is equipped with the reinforcing ribs 632. The reinforcing ribs 632 are arranged on an outer peripheral surface of the cylindrical portion 630. The reinforcing ribs 632 protrude from the outer peripheral surface of the cylindrical portion 630 radially outwardly and also extend from the bottom wall 612 of the body retaining portion 61 in the axial direction. In other words, the reinforcing ribs 632 are joined both to the bottom wall 612 and to the cylindrical portion 630 in the form of a one-piece member.

The fastening portions 64 are each formed in a tongue-plate shape and extend from the microphone facing portion 63 toward the base side in the axial direction along the longitudinal center line CL. In this embodiment, the fastening portions 64 include a pair of upper and lower fasteners. Specifically, the two fastening portions 64 are diametrically opposed to each other about the longitudinal center line CL. In other words, the fastening portions 64 are located symmetrically with each other with respect to the longitudinal center line CL.

Each of the fastening portions 64 is equipped with the engaging portion 65. The engaging portion 65 is defined by a through-hole extending through a thickness of the fastening portion 64 in the vertical direction. The engaging portion 65 serves as an engaging hole which achieves mechanical engagement with the fastening protrusion 43 on the case base 42a of the sensor body 2 and is located in coincidence with the fastening portion 43 in the temporarily assembled condition and the vehicle-mounted condition. The retainer member 6 serves to have the case base 42a disposed in inner space of the body retaining portion 61 and achieves joints of the fastening protrusions 43 to the engaging portions 65, thereby holding the sensor body 2 therein.

The fastening portions 64 are formed in a cantilever shape to be swingable in the radial direction, i.e., a thickness-wise direction thereof within the respective moulded holes 66. The moulded holes 66 pass through the body retaining portion 61 and the vehicle body-attaching portions 62 in the axial direction, i.e., the front-back direction. In this embodiment, fixed ends that are ends of the fastening portions 64 located on the tip side in the axial direction are rigidly joined to the microphone facing portion 63 substantially at the middle of the length of the cylindrical portion 630. The engaging portions 65 are located closer to free ends of the fastening portions 64 than to the fixed ends. The free end of each of the fastening portions 64 is an end of the fastening portion 64 located on the base side in the axial direction of the fastening portion 64.

The microphone facing portion 63 has formed in a lower end thereof the drain path 67 which extends through the microphone facing portion 63 or the fastening portions 64 in the radial direction, i.e., the vertical direction. The drain path 67 serves to drain water from an inner space SP in the microphone facing portion 63. In other words, the drain path 67 is capable of discharging water from a gap between the microphone facing portion 63 and the cushion member 5.

In this embodiment, the drain path 67 extends both in the microphone facing portion 63 and a lower one of the fastening portions 64. Specifically, the drain path 67 extends from the microphone facing portion 63 to near the root (i.e., the fixed end) of the fastening portion 64.

In this embodiment, the drain path 67 has formed in an axial end portion thereof the opening 68 which is oriented in the axial direction. In other words, the drain path 67 is defined by a cutout portion or slit extending from the flanged attaching portion 631 toward the base side in the axial direction. In this embodiment, the drain path 67 has a width or an opened lateral dimension substantially kept constant in the axial direction.

The microphone facing portion 63 has the stamped wall portion 69 formed in an upper end portion thereof. Specifically, the stamped wall portion 69 is diametrically opposed to the drain path 67 through the longitudinal center line CL. In other words, the microphone facing portion 63 has the drain path 67 and the stamped wall portion 69 arranged symmetrically with each other with respect to the longitudinal center line CL.

In this embodiment, the stamped wall portion 69 passes through the microphone facing portion 63 in the radial direction. Specifically, the stamped wall portion 69 is, like the drain path 67, formed by a slit communicating between outside the retainer member 6 and the inner space SP in the retainer member 6.

The stamped wall portion 69 is aligned with the drain path 67. In other words, the stamped wall portion 69 in this embodiment extends both in the microphone facing portion 63 and in an upper one of the fastening portions 64. The stamped wall portion 69 is formed by a cutout or a slit which extends from the flanged attaching portion 631 toward the base side in the axial direction and has an opening oriented to the tip side in the axial direction. The stamped wall portion 69 has a width or lateral opened dimension kept substantially constant in the axial direction and identical with that of the drain path 67. In other words, the stamped wall portion 69 is formed to have the same shape as that of the drain path 67.

As apparent from the above discussion, the microphone facing portion 63 is made of two sections: a right and a left section isolated by the drain path 67 and the stamped wall portion 69 made of slits arranged away from each other in the vertical direction. In other words, a pair of flanged attaching portions 631 which are isolated from each other by the drain path 67 and the stamped wall portion 69 which are vertically arranged are disposed away from each other in the lateral direction.

Each of the right and left sections of the microphone facing portion 63 is equipped with two reinforcing ribs 632. Specifically, one of the two discrete sections of the microphone facing portion 63 has the two reinforcing ribs 632, while the other section also has the two reinforcing ribs 632.

The total of four reinforcing ribs 632 are arranged symmetrically with each other both in the vertical direction and in the lateral direction. Specifically, an upper one of the reinforcing ribs 632 of one of the discrete sections of the microphone facing portion 63 and a lower one of the reinforcing ribs 632 of the other section of the microphone facing portion 63 are located symmetrically with respect to the longitudinal center line CL. Similarly, a lower one of the reinforcing ribs 632 of one of the discrete sections of the microphone facing portion 63 and an upper one of the reinforcing ribs 632 of the other section of the microphone facing portion 63 are located symmetrically with respect to the longitudinal center line CL.

In this embodiment, the four reinforcing ribs 632 are arranged at angular or circumferential positions of 45°, 135°, 225°, and 315° in a circumferential direction which will be defined later. The circumferential direction is a direction surrounding the longitudinal center line CL. In other words, the circumferential direction is identical with a circumferential direction of the above described imaginary circle. The circumferential positions are points on the imaginary circle indicated by a chain double-dashed line in FIG. 4 and expressed by angles. The center of the width of the stamped wall portion 69 in the circumferential direction is determined as a reference position for the circumferential positions expressed by angles and defined as 0°. The center of the width of the drain path 67 is defined as 180°.

Beneficial Effects

The beneficial effects offered by the structure in this embodiment will be described below with reference to the drawings.

In the structure in this embodiment, the engaging portion 65 in each of the fastening portions 64 extending from the microphone facing portion 63 of the retainer member 6 engages a corresponding one of the fastening protrusions 43 on the sensor body 2 of the ultrasonic sensor 1. This establishes the temporarily assembled condition or the vehicle-mounted condition in which the retainer member 6 is secured to the ultrasonic sensor 1.

Upon attachment of the retainer member 6 to the ultrasonic sensor 1, the body retaining portion 61 has a portion of the microphone support 4 of the sensor body 2, i.e., the case base 42a disposed therein. The microphone facing portion 63 of the retainer member 6 is located radially outside the ultrasonic microphone 3 of the sensor body 2. The ultrasonic microphone 3 is, therefore, disposed in the inner space SP of the microphone facing portion 63.

The microphone facing portion 63 has the exposed portion 53 which is located on the tip side of the cushion member 5 in the axial direction and exposed outside the microphone facing portion 63. The microphone facing portion 63 grips the held portion 54 of the cushion member 5 located on the base side in the axial direction of the cushion member 5 between itself and a portion of the outer peripheral surface 30 of the ultrasonic microphone 3 corresponding to the protruding portion 31.

The flanged attaching portion 631 which is formed by the tip end of the length of the microphone facing portion 63 is placed in close contact with a portion of the cylinder 51 of the cushion member 5 corresponding to the held portion 54. The flanged attaching portion 631 faces the flange 52 of the cushion member 5 in the axial direction and contacts the flange 52. The flanged attaching portion 631, therefore, stops the held portion 54 of the cushion member 5 from being moved. The protruding portion 31 of the ultrasonic microphone 3 is shield or covered with the exposed portion 53 of the cushion member 5 in close contact with the exposed portion 53 and disposed in the mounting hole V4 of the front grille V3 in the vehicle-mounted condition.

When it is raining or the vehicle is being washed in the vehicle-mounted condition, there is a risk that water may enter a portion of each of the ultrasonic sensors 1 joined to the front grille V3. Specifically, water may be admitted from outside the vehicle body V1 into an air gap between the inner peripheral surface V5 of each of the mounting holes V4 in the front grille V3 and the cushion member 5.

A portion of the ultrasonic sensor 1 joined to the front grille V3 may have an air gap into which water is admitted from outside the ultrasonic sensor 1. For instance, a gap may be formed between the ultrasonic microphone 3 and the microphone facing portion 63 of the retainer member 6. Specifically, such an air gap is typically created between the front grille V3 and/or the retainer member 6 and the cushion member 5 around the mounting hole V4 in the front grille V3.

For example, an air gap into which water is admitted may occur among the tip of the flanged attaching portion 631 in the axial direction, the back surface of the front grille V3, and the outer peripheral surface of the exposed portion 53 of the cushion member 5. Additionally, an air gap into which water is admitted may occur between the cushion member 5 and the retainer member 6, i.e., between the cushion member 5 and the microphone facing portion 63. This may cause water to enter the above air gap from outside the front grille V3. When such water is accumulated, it may result in an increase in unwanted reflected waves arising from propagation of vibration through the accumulated water, which leads to an error in detection of an object.

In contrast to the above, the retainer member 6 in this embodiment is equipped with the drain path 67. The drain path 67 is formed to radially pass through the microphone facing portion 63 and the fastening portion 64 extending from the microphone facing portion 63. Specifically, the drain path 67 radially passes through the microphone facing portion 63 and the fastening portions 64 at a lower end portion of the microphone facing portion 63 to communicate between the above described air gap and an external space below the retainer member 6.

The drain path 67 is, therefore, capable of discharging water from the inner space SP in the microphone facing portion 63 to the outside. The water having entered the air gap is, thus, drained to the external space below the retainer member 6 through the drain path 67, thereby avoiding undesirable accumulation of water in the air gap.

The formation of the drain path 67 will result in a decrease in mechanical stiffness of the microphone facing portion 63 and the fastening portion 64, thereby resulting in imbalance in stiffness between areas of the microphone facing portion 63 which face each other across the longitudinal center line CL or between the fastening portions 64. This leads to deterioration of fixation of the ultrasonic sensor 1 in the vehicle-mounted condition.

In order to alleviate the above problem, the retainer member 6 in this embodiment is equipped with the stamped wall portion 69. The stamped wall portion 69 is formed in the microphone facing portion 63a and the fastening portions 64 and opposed to the drain path 67 across the longitudinal center line CL. The stamped wall portion 69 is arranged to face the drain path 67. Specifically, the drain path 67 is formed in the microphone facing portion 63. Similarly, the stamped wall portion 69 is also formed in the microphone facing portion 63. The drain path 67 is also formed in the fastening portions 64. Similarly, the stamped wall portion 69 is also formed in the fastening portions 64. More specifically, the stamped wall portion 69 is, like the drain path 67, formed to pass both through the microphone facing portion 63 and through the fastening portions 64 in the radial direction.

With the above arrangements, the formation of the drain path 67 results in a decrease in stiffness of the microphone facing portion 63 and the fastening portion 64. The formation of the stamped wall portion 69 also results in a decrease in stiffness of the microphone facing portion 63 and the fastening portion 64. The stamped wall portion 69 and the drain path 67 face each other through the longitudinal center line CL in the microphone facing portion 63 and the fastening portions 64 This minimizes the imbalance in stiffness between the areas facing each other through the longitudinal center line CL.

Specifically, the microphone facing portion 63 has formed therein the drain path 67 and the stamp wall portion 69 which radially pass through the thickness of the microphone facing portion 63 and face each other across the longitudinal center line CL. This minimizes the imbalance in stiffness of areas of the cylindrical microphone facing portion 63 which are opposed to each other through the longitudinal center line CL.

The instability in gripping the cushion member 5 covering the ultrasonic microphone 3 using the microphone facing portion 63 is, therefore, eliminated. In other words, the degree to which the flanged attaching portion 631 firmly grips the cushion member 5 is uniformed in the circumferential direction thereof. This minimizes a risk that the cushion member 5 may be undesirably deformed at a location of the drain path 67, thereby removal of the cushion member 5 from the outer periphery of the ultrasonic microphone 3.

In this embodiment, the drain path 67 is shaped to extend both in the microphone facing portion 63 and in a first one of the fastening portions 64, thereby facilitating discharge of water which has entered an air gap between the retainer member 6 and the cushion member 5 to external space below the drain path 67.

The stamped wall portion 69 is, like the drain path 67, shaped to extend both in the microphone facing portion 63 and in a second one of the fastening portions 64. In other words, the drain path 67 which radially extends through the thickness of the fastening portion 64 and the stamped wall portion 69 which radially extends through the thickness of the fastening portion 64 are opposed to each other through the longitudinal center line CL.

The above arrangements eliminates imbalance in retaining the sensor case 42 between the first fastening portion 64 in which the drain path 67 is formed and the second fastening portion 64 in which the stamped wall portion 69 is formed. In other words, the imbalance in retaining the sensor case 42 which will arise from the formation of the drain path 67 only in a lower one of the fastening portions 64 is eliminated.

In this embodiment, the drain path 67 has the opening 68 oriented in the axial direction. In other words, the drain path 67 is formed by a cutout or a slit extending from the flanged attaching portion 631 toward the base side in the axial direction.

Water, as described above, may enter an air gap among the tip of the flanged attaching portion 631 in the axial direction, the back surface of the front grille V3, and the outer peripheral surface of the exposed portion 53 of the cushion member 5. Such water is, however, discharged by the drain path 67 to external space below the drain path 67.

This embodiment also eliminates the risk, as described above, that water may enter an air gap created in a joint of the ultrasonic sensor 1 to the front grille V3 and then be accumulated therein using the drain path 67. This minimizes a failure in operation of the ultrasonic sensor 1 due to entry of rain thereinto in the vehicle-mounted condition.

This embodiment has the stamped wall portion 69 in addition to the drain path 67, thereby, as described above, minimizing the imbalance in stiffness between portions of the microphone facing portion 63 and the fastening portions 64 which face each other across the longitudinal center line CL and also eliminating the risk of a failure in operation of the ultrasonic sensor 1 due to entry of water, such as rain, thereinto in the vehicle-mounted condition. This embodiment, thus, provides a suitable means for solving the problem with discharge of water from a joint of the ultrasonic sensor 1 to a vehicle body component, such as the front grille V3, using the retainer member 6.

When the ultrasonic sensors 1 are required to be attached to the bumper V2, it may be preferably made without encountering the above problems by forming, like in the above patent literature 1, sensor fastening ribs with drain holes on an inner surface of the bumper V2. It is, however, difficult to form ribs with drain holes, like on the bumper V2, on the front grille V3 in terms of design or structure thereof.

Accordingly, this embodiment is designed not to have the drain path 67 formed in the front grille V3, but in the retainer member 6 for use in attaching the sensor body 2 to the front grille V3. This enables a vehicle body component, such as the front grille V3, which has a relatively small continuous surface area and a complicated shape to be free from the problem of water draining.

In this embodiment, the cylindrical portion 630 is designed to have the reinforcing ribs 632 formed thereon. The reinforcing ribs 632 protrude radially outward and extend from the bottom wall 612 in the axial direction. In other words, each of the reinforcing ribs 632 is integrally joined both to the bottom wall 612 and to the cylindrical portion 630.

With the above arrangements, the microphone facing portion 63 and the flanged attaching portion 631 are mechanically reinforced by the reinforcing ribs 632. In other words, the reinforcing ribs 632 serve to minimize radially outward deformation of the microphone facing portion 63 due to pressure internally exerted on the inner periphery thereof when the retaining member 6 is secured to an assembly of the sensor body 2 and the cushion member 5. The cushion member 5 is well retained even in the case where the rain path 67 is designed to have an increased width or the drain path 67 and the stamped wall portion 69 are formed as a pair to be aligned with each other in the vertical direction.

Modifications

This disclosure is not limited to the above embodiment. The above embodiment may, therefore, be modified in various ways. Principal modifications of the embodiment will be described below. The following discussion will mainly refer to differences from the above embodiment. The same or similar reference numbers as employed in the above embodiment will refer to the same or similar parts, and explanation thereof in detail will be omitted here unless otherwise specified.

This disclosure is not limited to attachment of the ultrasonic sensors 1 to the front grille V3. Specifically, the above embodiment may be realized when the ultrasonic sensors 1 are attached to the bumper V2. The above embodiment may alternatively be realized when the ultrasonic sensors 1 are attached to a vehicle body panel. The attachment of the ultrasonic sensors 1 to the bumper V2 or the vehicle body panel may be achieved by modifying the structure of the retainer member 6 to match the structure of the bumper V2 or the vehicle body panel.

The ultrasonic sensors 1 are not limited to the structure capable of transmitting and receiving an ultrasonic wave. For instance, the ultrasonic sensors 1 may be engineered only to transmit an ultrasonic wave. The ultrasonic sensors 1 may alternatively be designed only to receive a return of an ultrasonic wave or a radar wave which has been outputted from another ultrasonic sensor and reflected by an object existing around the vehicle V.

The structures of the sensor body 2, the cushion member 5, and the retainer member 6 are not limited to those described in the above embodiment. Details of the structures of the sensor body 2, the cushion member 5, and the retainer member 6 may be modified unless they decrease the beneficial effects offered in this disclosure.

In the above embodiment, the fastening portions 64 extend from a portion of the cylindrical portion 630, as located closer to the tip side than the bottom wall 612 is, toward the base side in the axial direction. In other words, fixed ends of the fastening portions 64 which are jointed to the microphone facing portion 63 are located closer to the tip side (i.e., the front side) than the bottom wall 612 is. This disclosure is, however, not limited to the above arrangements. For instance, the fixed ends of the fastening portions 64 may alternatively be located closer to the base side (i.e., the rear side) than the bottom wall 612 is.

The configuration of the drain path 67 is not limited to that described above. For instance, the drain path 67 may be designed not to have the opening 68 on the tip side in the axial direction. Specifically, the drain path 67 may be shaped to have a tip closed by a bridge formed on the microphone facing portion 63.

The width of the drain path 67 may not necessarily be constant in the axial direction. Specifically, the drain path 67 may be shaped to have a first width in the fastening portion 64 and also have a second width in the microphone facing portion 63 which is large than the first width. The drain path 67 may alternatively be shaped to have a maximum width in the opening 68. Such structures well facilitate the draining of water from an air gap created in a joint of the ultrasonic sensor 1 to the front grille V3.

Figure 3:
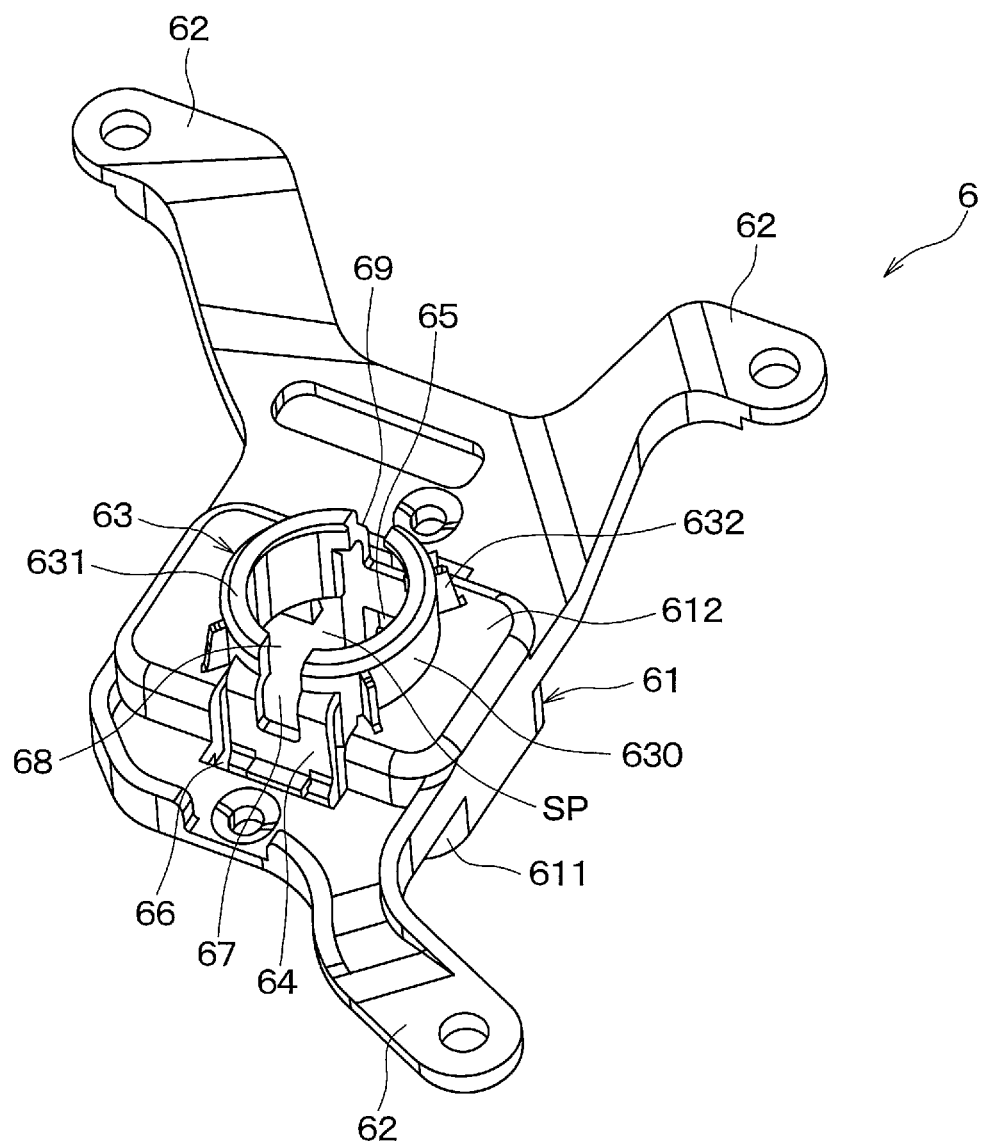
FIG. 3 is a perspective view which shows the appearance of a retainer member illustrated in FIG. 2.
Figure 4:
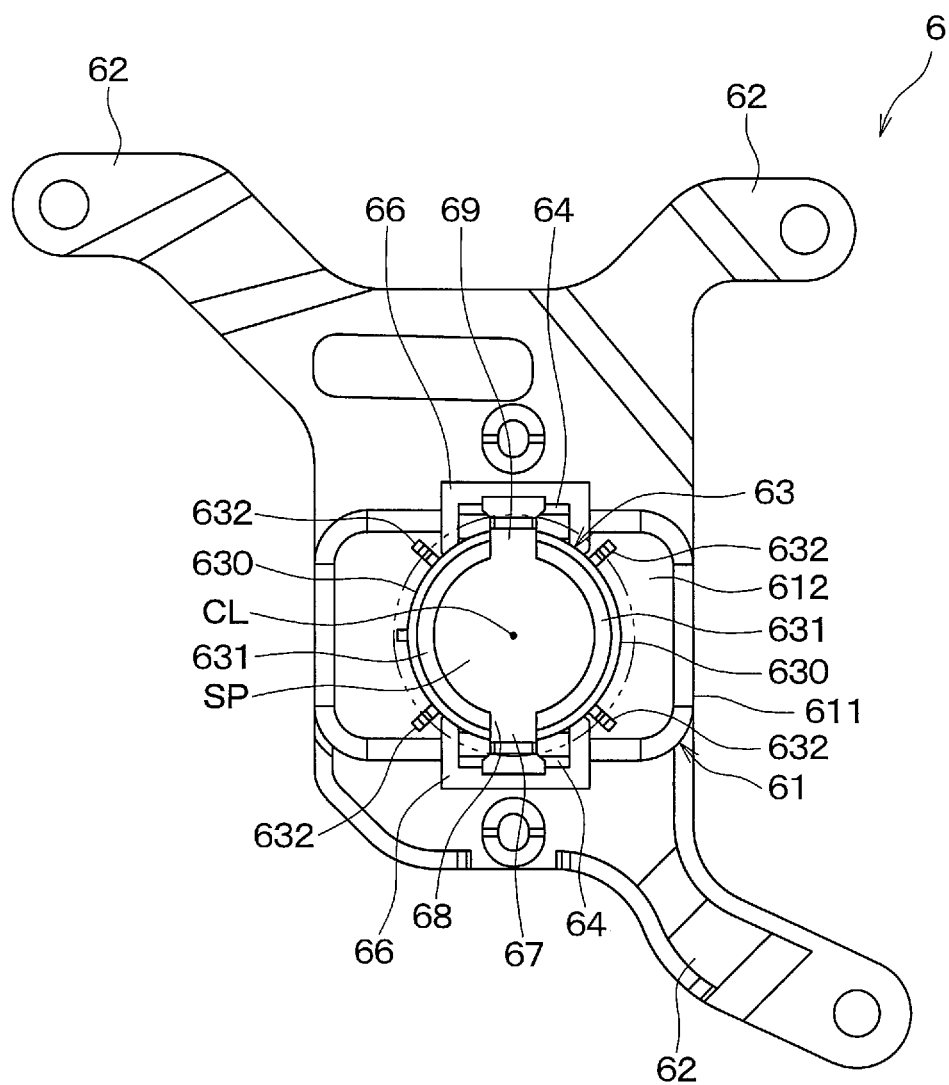
FIG. 4 is a plan view which illustrates the appearance of the retainer member shown in FIG. 3.
Figure 5:
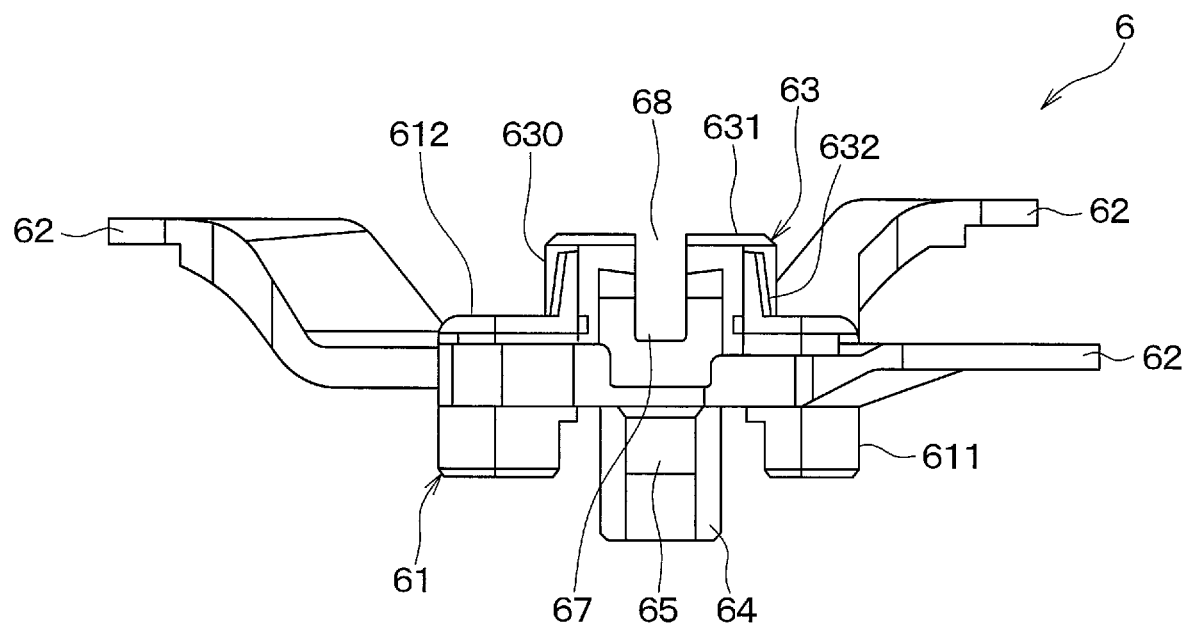
FIG. 5 is a side view which illustrates the appearance of the retainer member shown in FIG. 3.
Figure 6:
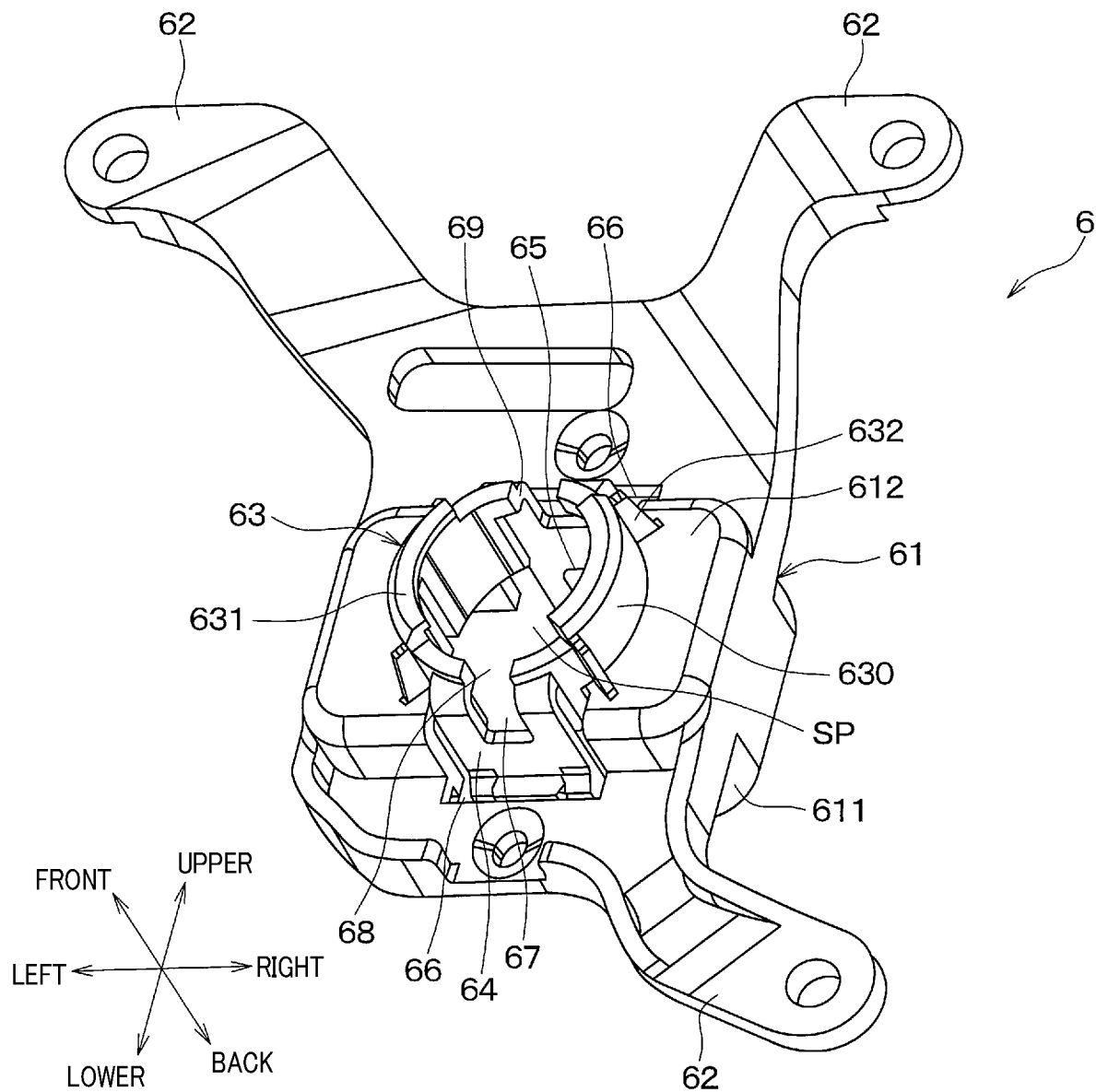
FIG. 6 is a perspective view which illustrates the appearance of a modified form of a retainer member.
Figure 7:
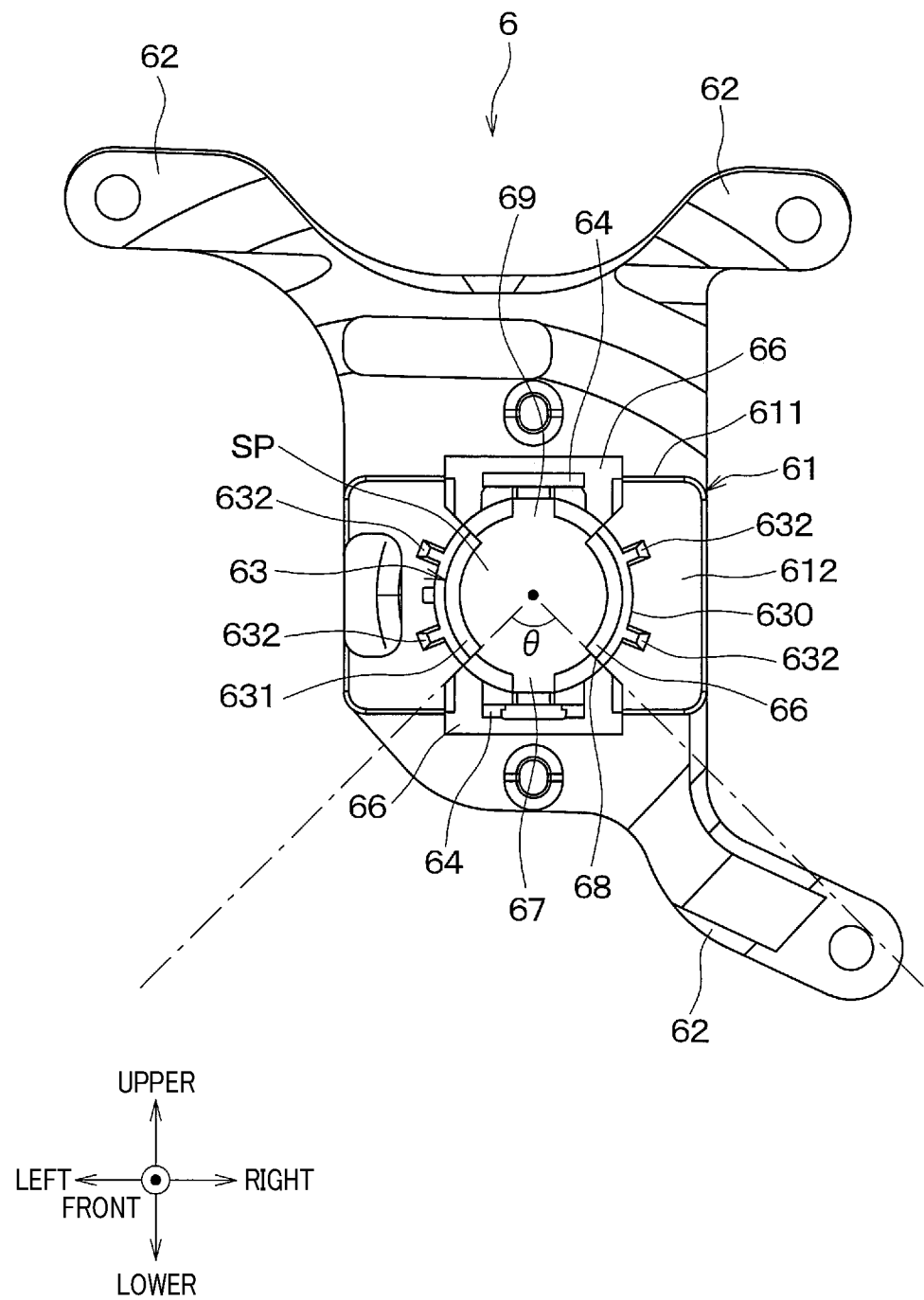
FIG. 7 is a plan view which illustrates the appearance of the retainer member shown in FIG. 6.

FIGS. 6 and 7 illustrate a modification of the retainer member 6 in FIGS. 3 to 5. Specifically, the drain path 67, as can be seen in FIGS. 6 and 7, has a first width on the tip side and a second width on the base side. The first width is larger than the second width. Specifically, the drain path 67 is shaped to have the first width in the flanged attaching portion 631 and the second width in the cylindrical portion 630. The first width is selected to be larger than the second width. In other words, the drain path 67 has a maximum width in the flanged attaching portion 631, i.e., the opening 68. The stamped wall portion 69 has the same shape as that of the drain path 67.

More specifically, a portion of the drain path 67 formed in the flanged attaching portion 631 has the first width which, as can be seen in FIG. 7, occupies a central angle $\theta$ in a plan view which is larger than 20° or more and smaller than 90° or less in the circumferential direction. A portion of the drain path 67 in the fastening portion 64 has a minimum width in a fixed end thereof and also has a constant width, as viewed facing the side of the drain path 67. The drain path 67 in the cylindrical portion 630 has the above maximum width on the tip side in the axial direction. The drain path 67 in the cylindrical portion 630 also has the above minimum width in a joint with the fastening portion 64. The drain path 67 in the cylindrical portion 630 is stepwisely shaped to widen from the minimum with to the maximum width.

The flanged attaching portion 631 is, therefore, shaped to have a given width in the circumferential direction to firmly retain the cushion member 5 in the lateral direction in the vehicle-mounted condition. In other words, the cushion member 5 is firmly held by the flanged attaching portion 631 in the lateral direction.

The drain path 67 is, therefore, placed in the vehicle-mounted condition to have a relatively large opening oriented downward. This creates a clearance which lies between the front grille V3 and the retainer member 6 in the vehicle-mounted condition and is capable of downward discharging water, as having entered into an air gap between the retaining member 6 and the cushion member 5, regardless of the configuration of the front grille V3. This ensures the stability in discharging water, as having reached the air gap among the axial tip of the flanged attaching portion 631, the back surface of the front grille V3, and the outer peripheral surface of the exposed portion 53 of the cushion member 5, downward from the drain path 67.

As an alternative to the above modification, the drain path 67 may be shaped to have a first width in the fastening portions 64 and a second width in the microphone facing portion 63 which is smaller than the first width. This enhances a mechanical joint of the flanged attaching portion 631 with the cushion member 5 without sacrificing the ability in draining water.

Each of the drain path 67 and the stamped wall portion 69 may alternatively be formed only in one of the microphone facing portion 63 and the fastening portions 64. Specifically, each of the drain path 67 and the stamped wall portion 69 may be formed only in the microphone facing portion 63.

Each of the drain path 67 and the stamped wall portion 69 may alternatively be formed only in the fastening portions 64. This enhances the mechanical strength of the microphone facing portion 63 without sacrificing the ability in draining water from the clearance between the retainer member 6 and the cushion member 5.

In the above embodiment, the drain path 67 and the stamped wall portion 69 coincide with the fastening portions 64 in a circumferential direction defined around the longitudinal center line CL, but however, this disclosure is not limited to such arrangements.

Specifically, each of the drain path 67 and the stamped wall portion 69 may alternatively be formed in the microphone facing portion 63 and located away from the fastening portions 64 in the circumferential direction. In such a case, the two fastening portions 64 are provided and face each other in the lateral direction. This layout minimizes a change in joining ability of the fastening portions 64 which is caused by the drain path 67 and the stamped wall portion 69.

The shape of the stamped wall portion 69 is not limited to that referred to in the above embodiment. For instance, the stamped wall portion 69 may be formed to be different in shape from the drain path 67. As an example, the stamped wall portion 69 may have a width which is different from that of the drain path 67 or alternatively be different in distribution in width from the drain path 67 in the axial direction.

Specifically, the stamped wall portion 69 in FIGS. 6 and 7 may be designed to have the same shape as in FIG. 3. The stamped wall portion 69 may alternatively be implemented by a plurality of small through-holes formed in the microphone facing portion 63.

The stamped wall portion 69 may be defined by a hole shaped not to extend thorough the microphone facing portion 63 in the radial direction thereof. In other words, the stamped wall portion 69 may be created by a thin-walled portion of the microphone facing portion 63.

In the above embodiment, each of the two discrete sections of the microphone facing portion 63 is equipped with the two reinforcing ribs 632, but however, this disclosure is not limited to such arrangements. For instance, the number of the reinforcing ribs 632 is not limited to two as long as the discrete sections of the microphone facing portion 63 have the same number of the reinforcing ribs 632. For instance, each of the discrete sections of the microphone facing portion 63 may have a single reinforcing rib 632 or three reinforcing ribs 632 formed thereon.

Figure 8:
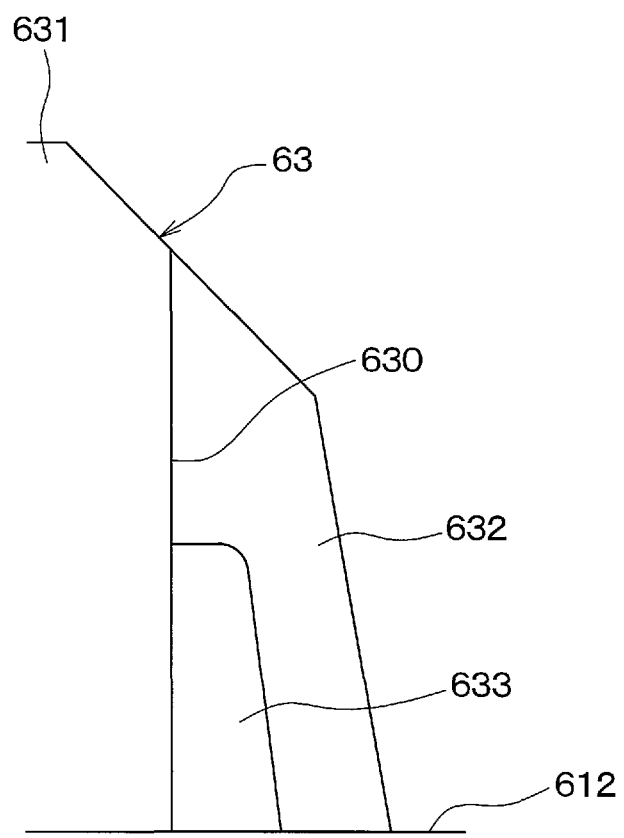
FIG. 8 is an enlarged side view which illustrates a modified form of a reinforcing rib shown in FIG. 7.

The reinforcing ribs 632 may be, as illustrated in FIG. 8, shaped to have the through-hole 633 formed therein. The through-hole 633 extends through the thickness of a root portion of each of the plate-like reinforcing ribs 632 in the circumferential direction. The root portion of the reinforcing rib 632 corresponds to an axial end of the reinforcing ribs 632 located on the base side, that is, a joint thereof with the bottom wall 612. The through-hole 633 minimizes a risk that water may be accumulated on the root portion of the reinforcing rib 632.

A plurality of component parts which are formed integrally with each other in a seamless way referred to in the above discussion may alternatively be made of a plurality of discrete parts attached to each other. Similarly, an assembly of discrete parts joined together referred to in the above discussion may alternatively be made of a single seamless member without any joint.

A plurality of component parts, as referred to in the above discussion, which are made from the same material may alternatively be made from materials different from each other. Similarly, a plurality of component parts, as referred to in the above discussion, which are made from different materials may be made from the same material.

The term "part or component part", as referred to in this disclosure, does not necessarily mean an integrally-formed member which is mechanically inseparable. For instance, a portion of each of the retainer members 6 may be designed to be removable from another portion thereof. The term "removable" means that an ordinary user other than skilled people can easily detach a portion of the retainer member 6 with or without any tool, such as a screw driver.

The component parts described in the above embodiment are not necessarily essential unless otherwise specified or viewed to be essential in principle. When the number of the component parts, a numerical number, a volume, or a range is referred to in the above discussion, this disclosure is not limited to it unless otherwise specified or viewed to be essential in principal. Similarly, when the shape of, the orientation of, or the positional relation among the component parts is referred to in the above discussion, this disclosure is not limited to it unless otherwise specified or viewed to be essential in principal.

The modifications are also not limited to the above described examples. A portion or whole of the embodiment may be combined with one or some of the modifications.

What is claimed is:

1. A retainer member which secures an ultrasonic sensor to a vehicle body component, the ultrasonic sensor configured to be equipped with a sensor body which includes a cylindrical ultrasonic microphone and a microphone support, the ultrasonic microphone extending in an axial direction parallel to a longitudinal center line and including a protruding portion located on a tip side thereof in the axial direction and a supported portion located on a base side thereof in the axial direction, the microphone support having the protruding portion protruding outside thereof and also retaining the supported portion, comprising:
- a body retaining portion which is formed in a cylindrical shape with a bottom and has an opening in a base side thereof in the axial direction, the body retaining portion having at least a portion of the microphone support disposed therein;
- a microphone facing portion which is of a cylindrical shape accommodating the ultrasonic microphone, disposed outside the ultrasonic microphone in a radial direction oriented radially from the longitudinal center line, and extends from the body retaining portion toward the tip side in the axial direction;
- a pair of fastening portions which are each of a plate-like shape and equipped with engaging portions engaging the sensor body, the fastening portions extending from the microphone facing portion toward the base side in the axial direction along the longitudinal center line, the fastening portions facing each other across the longitudinal center line;
- a drain path which passes through the microphone facing portion or a first one of the fastening portions in the radial direction and serves to discharge water from an inner space in the microphone facing portion to outside the inner space; and
- a stamped wall portion which faces the drain path through the longitudinal center line and is located in the microphone facing portion or a second one of the fastening portions in alignment with the drain path.

2. The retainer member as set forth in claim 1, wherein the stamped wall portion is shaped to pass through the microphone facing portion or the fastening portion in the radial direction.

3. The retainer member as set forth in claim 1, wherein the drain path and the stamped wall portion are shaped to extend both in the microphone facing portion and in the fastening portions.

4. The retainer member as set forth in claim 1, wherein the microphone facing portion is equipped with reinforcing ribs which protrude outward in the radial direction and extend from the body retaining portion in the axial direction.

5. The retainer member as set forth in claim 1, wherein an end of the drain path in the axial direction has an opening oriented in the axial direction.

6. The retainer member as set forth in claim 1, wherein the sensor body has disposed thereto a cushion member which is made from an elastic synthetic resin material in a cylindrical shape and covers the ultrasonic microphone,
- the microphone facing portion grips the cushion member between itself and the ultrasonic microphone, and
- the drain path is provided to be capable of draining water from a clearance between the microphone facing portion and the cushion member.

7. The retainer member as set forth in claim 6, wherein the sensor body is shaped to be cylindrical and have a shoulder so that the ultrasonic microphone has a decreased diameter,
- the cushion member is configured to be gripped between an outer peripheral surface of the ultrasonic microphone and an inner peripheral surface of a mounting hole that is a through-hole formed in the vehicle body component in a vehicle-mounted condition where the tip side of the ultrasonic microphone is disposed in the mounting hole.

8. The retainer member as set forth in claim 1, further comprising a vehicle body-attaching portion which extends in a direction intersecting the axial direction and is attached to the vehicle body component when the ultrasonic sensor is secured to the vehicle body component.

9. The retainer member as set forth in claim 1, wherein the vehicle body component is a front grille.

* * * * *